Figure 1:
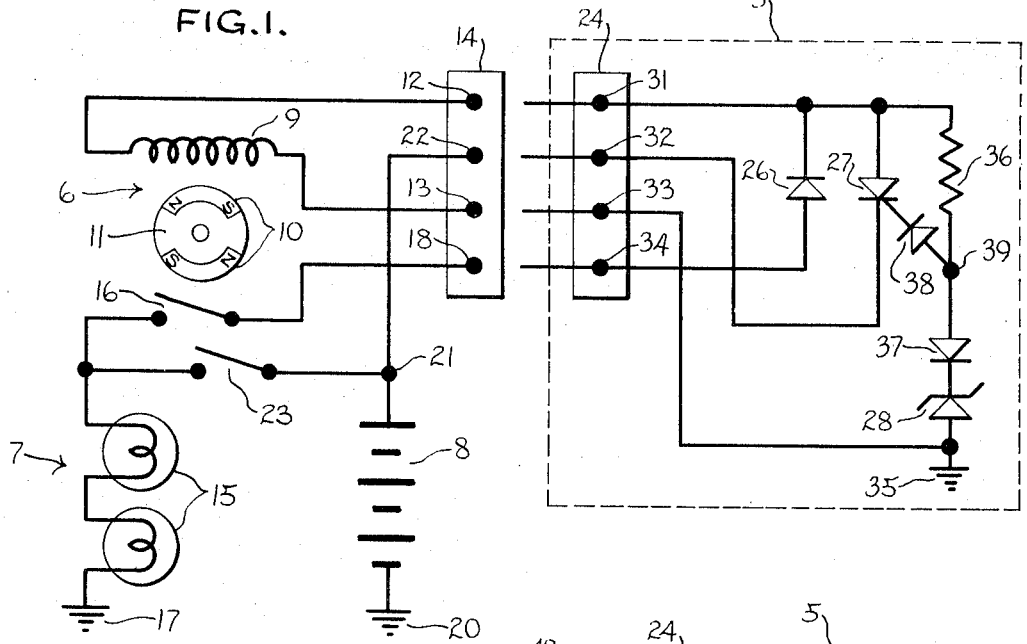

United States Patent [19]
Tharman

[11] 3,760,259
[45] Sept. 18, 1973

[54] RECTIFIER-REGULATOR MODULE FOR ALTERNATOR-BATTERY ELECTRICAL SYSTEMS

[75] Inventor: Paul A. Tharman, Milwaukee, Wis.

[73] Assignee: Briggs & Stratton Corporation, Wauwatosa, Wis.

[22] Filed: Aug. 16, 1972

[21] Appl. No.: 280,940

[52] U.S. Cl. ............. 322/28, 320/60, 322/89, 322/90
[51] Int. Cl. ............................................. H02p 9/30
[58] Field of Search ............. 322/28, 89, 90, 94; 320/2, 6, 15, 59, 60, 61, 71; 321/18; 307/11, 12

[56] References Cited
UNITED STATES PATENTS

| | | | |
|---|---|---|---|
| 3,568,031 | 3/1971 | Eberts | 320/61 X |
| 3,369,170 | 2/1968 | Custer | 322/89 X |
| 3,439,255 | 4/1969 | Carnes et al. | 322/28 |
| 3,152,298 | 10/1964 | Byles | 322/33 X |
| 3,523,212 | 8/1970 | Murphy | 323/24 UX |
| 3,332,004 | 7/1967 | Shano | 322/94 X |
| 3,636,434 | 1/1972 | Beuk | 322/94 X |

*Primary Examiner*—James D. Trammell
*Attorney*—Ira Milton Jones

[57] ABSTRACT

A regulator-rectifier module comprises a diode, an SCR having its gate connected with a resistor-zener diode regulating circuit, and a plug connector with four terminal members. One terminal member is connected with one side of each of the SCR and the diode, which are arranged for alternate conduction. A second terminal member is connected with the other side of the SCR, and a third with the other side of the diode, and the fourth is grounded. Connections to the plug connector are disclosed whereby half-wave regulated battery charging is effected with one module, full-wave operation with two.

3 Claims, 2 Drawing Figures

Patented Sept. 18, 1973

3,760,259

RECTIFIER-REGULATOR MODULE FOR ALTERNATOR-BATTERY ELECTRICAL SYSTEMS

This invention relates to electrical systems of the type comprising a source of alternating current, a load circuit that can be energized with current from said source, a battery that provides an alternate source for energizing the load circuit when the alternating current source is not available, and rectifier and voltage regulating means through which the battery can be charged from the alternating current source; and the invention has more particular reference to a voltage regulating and rectifier module for use in such an electrical system.

Electrical systems in which modules of this invention are intended to be incorporated are used in various types of automotive vehicles and in other machines that are powered by internal combustion engines. In such an installation the electrical system may include a starter for the engine, vehicle lights, and possibly other accessories, all of which comprise a load circuit. The primal energizing source for the load circuit is an alternator driven by the engine. But since the load circuit must often be energized at times when the engine is not running, as during operation of the starter, the electrical system also includes a storage battery, together with voltage regulator and rectifier means by which the battery can be charged from the alternator.

The voltage regulator and rectifier means of the present invention is one that is particularly suitable for installation on small riding tractors and similar machines that are powered by single-cylinder gasoline engines. Hence the invention is herein discussed and described with special reference to an installation of that character, but it is to be understood that this is by way of particularly approrpiate example and is not meant to imply that the utility of the invention is limited to such machines.

Basically, the electrical circuitry of the module of the present invention is that of the copending application of J. R. Harkness, Ser. No. 229,891 filed Feb. 28, 1972. In the electrical system of that patent application, there is a single winding which comprises an a.c. source, and current of one phase that is induced in the winding is used exclusively for battery charging while current of the opposite phase is used exclusively for powering the load circuit. In that novel arrangement the voltage regulator and rectifier means comprises a pair of rectifiers, one of them being a controlled rectifier through which current is passed to the battery in accordance with its condition of charge, and the other being a diode through which current is fed to the load circuit. The major advantages of that half-wave system are simplicity, low cost, and the imposition of a minimal load on the engine inasmuch as a.c. power is generated only to the extent required to meet the existing demands of load circuit energization and of battery charging. However, for other than a relatively simple electrical system with low power requirements, half-wave battery charging and load circuit energization may not be adequate.

The present invention resides in part in an appreciation that the regulator and rectifier apparatus of the above mentioned patent application, when associated with certain terminal members that facilitate the making of connections to it, can be embodied in a very versatile module capable of serving in both a half-wave system of the type therein disclosed and in a full-wave system suitable for heavier duty electrical equipment.

Thus it is the general object of this invention to provide an inexpensive, standardized regulator-rectifier module for electrical systems of the character described, capable of being incorporated into both half-wave and full-wave systems and suitable for use with both light duty and heavy duty load circuits.

Another and more specific object of this invention is to provide a module of the character described which is in itself a half-wave regulator and rectifier and which is capable of cooperation with another identically similar module to provide a full-wave rectified and regulated battery charging system, the connections between the module or modules and other components of the system being made by plug connectors that can likewise be standarized.

It will be apparent that it is a further object of this invention to provide a standarized module of the character described that makes possible the standardization of other components of electrical systems in which it can be incorporated, and enables all such components to be adapted to different types of systems by simple changes in the wiring of plug connectors that connect them, thereby reducing inventories, simplifying and reducing the cost of production of a variety of electrical systems, and greatly simplifying service in the field.

It is also an object of this invention to provide a standardized regulator-rectifier module of the character described which can be installed in either a half-wave or a full-wave system without need for any modification and which has no components that are in any way superfluous to any type of system in which the module may be incorporated.

Still another object of this invention is to provide a module of the character described having components that can be mounted on a printed circuit board or can be potted in a small container for optimum resistance to vibration and impact.

With these observations and objectives in mind, the manner in which the invention achieves its purpose will be appreciated from the following description and the accompanying drawing, which exemplifies the invention, it being understood that changes may be made in the specific apparatus disclosed herein without departing from the essentials of the invention set forth in the appended claims.

Figure 2:
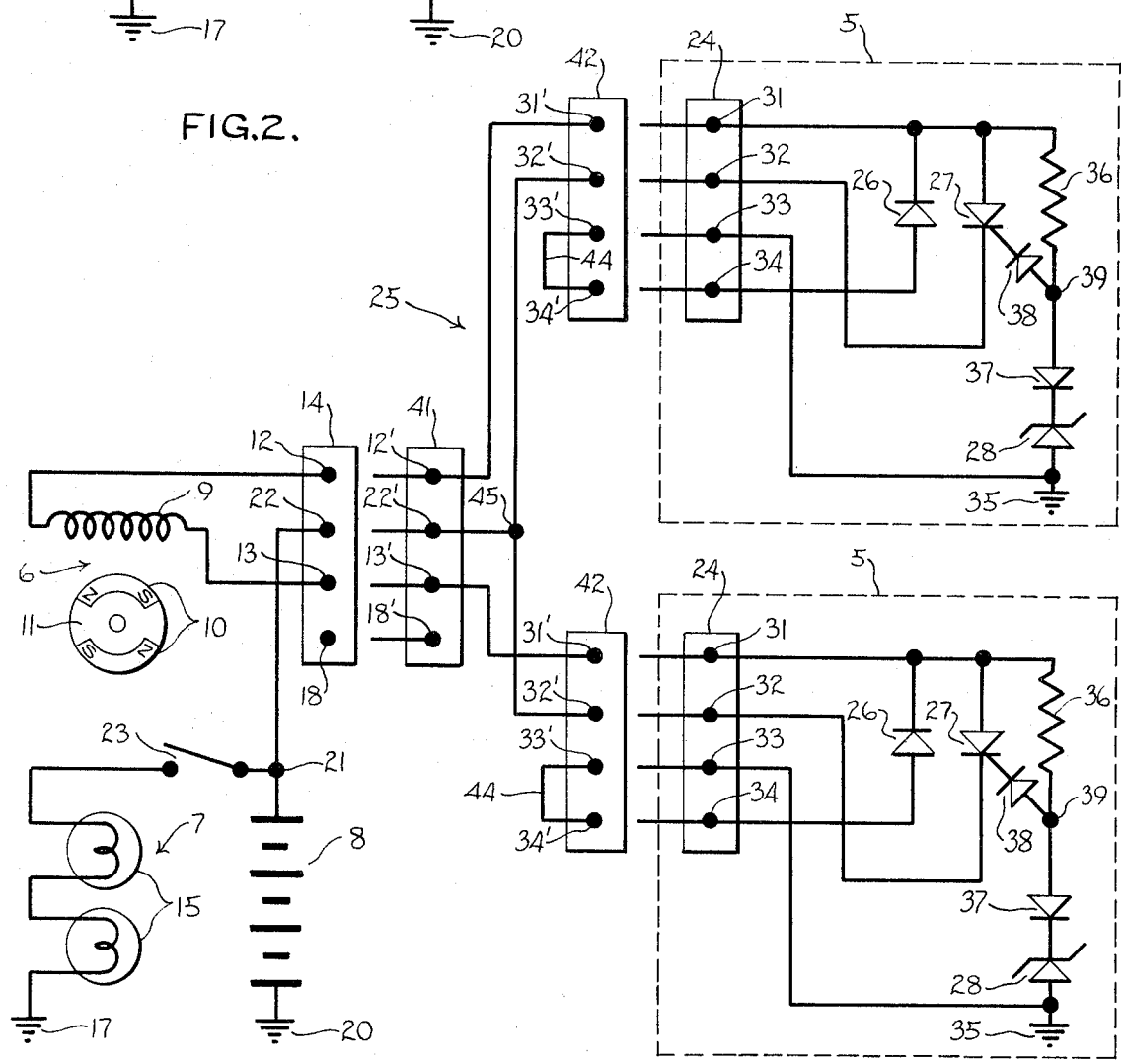

The accompanying drawing illustrates two complete examples of embodiments of the invention constructed according to the best modes so far devised for the practical application of the principles thereof, and in which:

FIG. 1 is a circuit diagram illustrating the incorporation of the module of this invention in a half-wave system; and FIG. 2 is a circuit diagram illustrating the incorporation of a pair of the modules of this invention in a full-wave system.

Referring now more particularly to the accompanying drawing, the numeral 5 designates generally a module embodying the principles of this invention, which is intended to be connected in an electrical system comprising an alternator 6, a load circuit 7 and a storage battery 8.

The alternator 6, which serves as the primal source of power for the electrical system, comprises a single winding 9, here shown as cooperating with permanent magnet means 10 mounted on an engine flywheel 11 or the like to be orbitally rotated in flux linking relation with the winding. For maximum versatility in cooperation with a module or modules 5 of this invention, the alternator winding 9 is made with both of its ends ungrounded. Preferably, too, the winding ends are connected with two of the terminals, designated 12 and 13, of a plug connector 14 that has four terminal members.

The load circuit 7 is illustrated as comprising a pair of headlights 15, although it will be understood that it can also comprise other electrical accessories which are not shown, such as an electric starter. Switch means 16 are of course incorporated in the load circuit for control of the various accessories.

The load circuit has a grounded terminal designated by 17 and an ungrounded terminal 18 that can comprise one of the terminal members of the plug connector 14. The battery 8 likewise has a grounded terminal 20, and it has an ungrounded terminal 21 that can be connected with the fourth terminal member 22 of the plug connector 14. Since both of the current sources have connections to the connector 14, that connector is preferably a female unit.

In the system illustrated in FIG. 1, which incorporates only one of the modules 5, the module functions during engine operation in the manner described in the aforesaid copending patent application, that is, it provides for half-wave energization of the load circuit with current of one phase that is induced in the winding 9 and for half-wave charging of the battery with current of the opposite phase induced in that winding. In that arrangement the battery and the load circuit are not effectively connected with one another at times when alternating current is available from the winding. A swtich 23 connected between the ungrounded terminals of the battery and the load circuit enables the load circuit to be energized from the battery at times when the flywheel 10 is not rotating.

The plug connector 14 can be connected directly to a mating plug connector 24 that comprises a part of a module of this invention, as illustrated in FIG. 1, or, as shown in FIG. 2, it can be connected with an adaptor 25 through which it can have plug connections with a pair of the modules 5 to provide for full-wave operation as described hereinafter.

Each of the modules 5 comprises, in general, a pair of rectifiers 26 and 27 and a regulating circuit comprising a zener diode 28. The module also has four terminal members 31, 32, 33 and 34 which can comprise the prongs of the plug connector 24.

The rectifier 26 can be an ordinary diode that is connected between two terminal members 31 and 34 to pass current flowing in one direction between those terminals and block current flow in the opposite direction. The rectifier 27 is an SCR, and it is so connected between the terminal member 31 and another terminal member 32 that when conducting it passes current of the phase that is blocked by the diode 26. Of course the SCR 27 always blocks current of the phase that is passed by diode 26.

The fourth terminal member 33 of the connector 24 is connected with a part of the module that is grounded, as indicated at 35.

The voltage regulating circuit comprising the zener diode 28 is connected with the gate terminal of the SCR 27 to provide for gating the SCR in accordance with the state of charge of the battery. That circuit also comprises a resistor 36, connected between the terminal member 31 and the zener diode. The zener diode is grounded, as at 35, and its series circuit with the resistor 36 also includes a diode 37 that prevents current flow through the zener diode in its forward direction. A diode 38 is connected between the gate of the SCR and a point 39 that is common to the zener diode and the resistor 36.

With the module 5 connected for half-wave operation in the arrangement illustrated in FIG. 1, the terminal members 31, 32, 33 and 34 of its plug connector 24 are respectively connected with their mating terminal members 12, 22, 13 and 18 of the plug connector 14. As a result, one end of the winding 9 is connected with the terminal member 31, by the way of terminal 12, and the other end of that winding is grounded by way of terminal 13 and its engaging grounded terminal member 33. Through terminal 18, in its connection with terminal member 34, the load circuit 7 is energized from the winding 9 with current of the phase that is passed by the diode 26. Through terminal 22, in its connection with terminal member 32, the battery 8 is charged with current of the opposite phase.

During each battery charging phase of the a.c., the resistor 36 and the zener diode 28 cooperate to maintain a substantially constant maximum potential at the gate of the SCR, which maximum potential is approximately equal to the fully charged voltage of the battery and is determined by the voltage at which the zener diode begins to conduct in its back direction. When the battery is up to its full charge, practically no current flows in the winding 9 during the battery charging half-cycles of the a.c. induced in it, since the SCR 27 is in blocking condition. If the battery is not up to full charge, the SCR will be gated on during at least a portion of each battery charging half-cycle, to pass charging current to the battery. The point in each such half-cycle at which the SCR becomes conductive depends upon the voltage across the battery. At the beginning of the next half-cycle of opposite phase the SCR is of course switched by the back voltage across it.

It will be observed that the terminal member 31 of the plug connector 24 serves as an input terminal, the terminal member 32 is an output terminal, and the terminal member 33 is a grounded terminal.

In the circuit illustrated in FIG. 2, which incorporates two of the modules 5 of this invention, the battery 8 is charged with full-wave rectified current, regulated to the charging needs of the battery, and whenever the load circuit is operating it is connected with the battery, so that the general arrangement is basically the conventional one for an automotive type electrical system. The alternator 6, battery 8 and load circuit 7 can be identical with those in the FIG. 1 embodiment, and they are likewise similarly connected with the terminals 12, 22 and 13 of the plug connector 14. In this case, however, since the load circuit is connected directly with the battery, the terminal 18 of the connector 14 is a blank instead of being connected with the ungrounded load circuit terminal.

The adapter 25, by which the terminals of the plug connector 14 are connected with the plug connectors 24 of the two modules 5, comprises a plug connector 41 that is complementary to the connector 14 and a pair of connectors 42 that are each complementary to a plug connector 24 of a module. The plug connector 41 has terminals 12', 22', 13' and 18' that respectively engage terminals 12, 22, 13 and 18 of connector 14; and each of the connectors 42 similarly has terminals 31', 32', 33' and 34' that engage the respective terminals members 31, 32, 33 and 34 of a module connector 24.

Each of the connectors 42 has a jumper connection 44 between its terminals 33' and 34', to ground the terminal 34 of each module 5. Further, each of the connectors 42 has its terminal 32' connected by means of a spliced conductor 45 to the terminal 22' of the connector 41, to thus provide for flow of current to the battery and load circuits from whichever of the modules has its SCR 27 conducting.

The terminal 31' of one of the connectors 42 (the upper one as shown in FIG. 2) is connected with the terminal 12' of the connector 41 and thus with one end of the winding 9. The terminal 31' of the other connector 42 is connected with terminal 13' of connector 41 and thus with the other end of the winding. It will be seen that by reason of the last mentioned connections with the winding 9, the SCRs 27 of the two modules alternate in conducting, and that when the SCR of a module has a back voltage across it, the diode 26 of that same module is conducting, although the current through that diode is controlled by the SCR of the other module. The two modules thus cooperate in defining a full-wave rectifier network comprising the four rectifiers 26 and 27, but the output of that network is controlled in accordance with battery charging requirements owing to the operation of the regulating circuits comprising the zener diodes 28.

The system shown in FIG. 2 can be used with a heavier duty electrical system than that shown in FIG. 1, even though its winding 9 can be identical with that of FIG. 1. This is true because the winding 9 in the FIG. 1 arrangement is always idle during half of its cycle whenever the load circuit is not in use, and the battery is charged only during the other half cycle whereas with the FIG. 2 arrangement battery charging current is being drawn from the winding during both phases of its cycle. Thus, assuming that the same winding is used in the arrangments of both FIG. 1 and FIG. 2, and that other accessories of the two arrangements have comparable power requirements, the FIG. 2 system can be successfully used with a substantially larger starting motor than that of FIG. 1 and with a correspondingly larger battery; or, if the additional available current is not needed for a battery that cooperates with a larger starting motor, the FIG. 2 arrangement can be used to energize additional or more powerful electrical accessories.

It is noteworthy, too, that the module 5 imparts versatility to other parts of the system, since a winding 9 and a battery 8 connected with terminals of a connector 14 can be connected either with one of the modules 5 for half-wave operation or with two such modules for full-wave operation.

Obviously one or two standardized modules of this invention can be used with a.c. sources of different windings and capacities, and with a variety of different sized batteries and load circuit arrangements, all without need for any change or modification in the basic module.

From the foregoing desription taken with the accompanying drawings it will be apparent that this invention provides a very simple, inexpensive and versatile rectifier and voltage regulator module that can be made as a standarized unit and incorporated without modification into systems that provide for half-wave battery charging and load energization and into systems that provide for full-wave battery charging and load energization.

The invention is defined by the following claims:

1. A rectifier and regulator module for connection with an alternating current source and with an electrical load circuit and a battery, to provide for simultaneously energizing the load and charging the battery so that the battery can be used for energizing the load at times when current is not available from said source, said module comprising:
   A. controlled rectifier means through which current of one phase can flow and which blocks flow of current of the opposite phase;
   B. voltage regulator means operatively connected in a circuit with said controlled rectifier means for controlling flow of current of said one phase through the controlled rectifier means;
   C. an input terminal member connected with one side of the controlled rectifier means and connectable with one terminal of an alternating current source;
   D. an output terminal member connected with the other side of the controlled rectifier means so that current of said one phase can flow through the controlled rectifier means from one of said terminal members to the other, said output terminal member being connectable with one terminal of a battery;
   E. a grounded terminal member with which said voltage regulator means is connected and to which a grounding jumper is connectable;
   F. an ungrounded fourth terminal member that can be used as an output terminal; and
   G. a diode connected between said input terminal member and said fourth terminal member and arranged to block current of said one phase and to pass current of said opposite phase.

2. The rectifier and regulator module of claim 1 in combination with;
   H. a winding which comprises said alternating current source and which has its opposite ends ungrounded;
   I. a first mating terminal member to which one end of said winding is connected and which is connectable with said input terminal member;
   J. a second mating terminal member to which the other end of said winding is connected and which is connectable with said grounded terminal member;
   K. a battery having a grounded terminal and an ungrounded terminal;
   L. a load circuit having a grounded terminal and an ungrounded terminal;
   M. means comprising a switch for connecting the ungrounded terminal of the battery with the ungrounded terminal of the load circuit;
   N. a third mating terminal member to which the ungrounded terminal of the battery is connected and which is connectable with said output terminal member; and
   O. a fourth mating terminal member to which the ungrounded terminal of the load circuit can be connected and which is connectable with said fourth terminal member.

3. In combination with a rectifier and regulator module of claim 1:

A. a second similar module;
B. a winding which comprises an alternating current source and which has its opposite ends ungrounded;
C. a battery having one grounded terminal and one ungrounded terminal;
D. a load circuit having one grounded terminal and one ungrounded terminal;
E. first conductor means connecting one end of the winding with the input terminal member of one of said modules;
F. second conductor means connecting the other end of the winding with the input terminal member of the other of said modules;
G. jumper means connecting the fourth terminal member of each module with the grounded terminal member thereof; and
H. other conductor means connecting the output terminal members of the two modules with the ungrounded terminals of the battery and the load circuit.

* * * * *